US009758432B2

(12) United States Patent
Landis et al.

(10) Patent No.: US 9,758,432 B2
(45) Date of Patent: Sep. 12, 2017

(54) METHODS OF USING IMPROVED BENTONITE BARRIER COMPOSITIONS AND RELATED GEOSYNTHETIC CLAY LINERS (75) Inventors: Charles R. Landis, The Woodlands, TX (US); Jimmy G. Youngblood, Humble, TX (US); Wen-Chin Andrew Liao, Kingwood, TX (US); Brian L. Coles, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/359,683

(22) Filed: Jan. 27, 2012

(65) Prior Publication Data

US 2012/0219367 A1   Aug. 30, 2012

Related U.S. Application Data (60) Provisional application No. 61/437,502, filed on Jan. 28, 2011.

(51) Int. Cl.
*E02D 3/12* (2006.01)
*C04B 28/00* (2006.01)
*C04B 111/00* (2006.01)

(52) U.S. Cl.
CPC ... C04B 28/001 (2013.01); *C04B 2111/00775* (2013.01); *C04B 2111/00801* (2013.01)

(58) Field of Classification Search
CPC ......... C04B 28/001; C04B 2111/00775; C04B 24/38
USPC .......... 405/129.45, 129.57, 129.75, 264, 266
See application file for complete search history.

(56) References Cited

U.S. PATENT DOCUMENTS

| 3,016,713 A | * | 1/1962 | Deming ............... 405/264 |
| 3,772,893 A | | 11/1973 | Eilers |
| 4,048,373 A | | 9/1977 | Clem |
| 4,139,588 A | | 2/1979 | Clem |
| 4,637,759 A | | 1/1987 | Owa et al. |
| 4,664,818 A | * | 5/1987 | Halliday et al. ........... 507/113 |
| 4,964,918 A | | 10/1990 | Brown et al. |

(Continued)

FOREIGN PATENT DOCUMENTS

EP          0611850 A1     8/1994
WO     WO 94/23137 A1   10/1994
(Continued)

OTHER PUBLICATIONS

Brandrup et al., "Polymer Handbook," Whiley-Interscience, XP-002674277, 1999, vol. 2, pp. VII-10-VII-11, table 1, p. VII-11.

(Continued)

*Primary Examiner* — Benjamin Fiorello
(74) *Attorney, Agent, or Firm* — McDermott Will & Emery LLP (57) ABSTRACT The present invention relates to improved bentonite barrier compositions having enhanced low permeability over time in containment applications. Of the many embodiments provided herein, one embodiment includes a method comprising: providing a bentonite barrier composition comprising: bentonite; and a polyanionic low molecular weight polymer; and forming a containment using the bentonite barrier composition to provide at least partial separation for a containment from its environment.

11 Claims, 4 Drawing Sheets

(56) References Cited

U.S. PATENT DOCUMENTS

| | | | |
|---|---|---|---|
| 5,008,025 A * | 4/1991 | Hen | 507/112 |
| 5,401,552 A | 3/1995 | Bohrer et al. | |
| 5,407,909 A | 4/1995 | Goodhue, Jr. et al. | |
| 5,564,864 A | 10/1996 | Simpson et al. | |
| 5,575,112 A | 11/1996 | Scheubel | |
| 6,303,204 B2 | 10/2001 | Mathieson | |
| 6,537,676 B1 | 3/2003 | Flynn et al. | |
| 6,610,780 B1 | 8/2003 | Payzant et al. | |
| 7,026,385 B2 | 4/2006 | Wammes et al. | |
| 2011/0113983 A1 * | 5/2011 | Bernu | C09K 17/50 106/15.05 |
| 2012/0216707 A1 * | 8/2012 | Youngblood et al. | 106/204.3 |
| 2012/0219366 A1 * | 8/2012 | Landis et al. | 405/268 |

FOREIGN PATENT DOCUMENTS

| | | | |
|---|---|---|---|
| WO | WO2012025564 A1 * | 8/2010 | |
| WO | 2012025564 A1 | 3/2012 | |
| WO | WO 2012/025564 A1 | 3/2012 | |

OTHER PUBLICATIONS

International Search Report and Written Opinion for PCT/GB2012/000083 dated May 7, 2012.
Official Action for Canadian Patent Application No. 2,825,608 dated Jul. 29, 2014.
Official Action for Eurpoean Patent Application 12 704 103.6 dated May 26, 2014.
Di Emidio, Gemmina et al. Hydraulic Conductivity of a Dense Prehydration GCL: Impact of Free Swell and Swelling Pressure, EuroGeo4, 2008.
Di Emidio, G. et al., Advances in Geosynthetic Clay Liners: Polymer Enhanced Clays, Geo-Frontiers, 2011.
Di Emidio, Gemmina et al., Hydraulic and Chemico-Osmotic Performance of Polymer Treated Clays, Ghent University Academic Bibliography, Abstract of PhD Thesis, 2010.
Communication of a Notice of Opposition for European Patent Application No. 12704101.0 dated Feb. 22, 2016.
Lewis, Richard, Hawley's Condensed Chemical Dictionary, 2007.
Official Action for Canadian Patent Application 2,825,254 dated Jul. 29, 2014.

* cited by examiner

METHODS OF USING IMPROVED BENTONITE BARRIER COMPOSITIONS AND RELATED GEOSYNTHETIC CLAY LINERS

RELATED APPLICATIONS

This application claims priority under 35 U.S.C. §119 from U.S. Provisional Application Ser. No. 61/437,502, filed on Jan. 28, 2011, entitled "Improved Bentonite Barrier Compositions and Related Geosynthetic Clay Liners", the disclosure of which is hereby incorporated by reference.

BACKGROUND

The present invention relates to improved bentonite barrier compositions, and more particularly, to the use of geosynthetic clay liners comprising these improved bentonite barrier compositions having enhanced low permeability over time in containment applications.

Various materials and procedures have been developed and utilized to form low permeability barriers in containment applications. For example, low permeability barriers are needed to separate waste fluids from contaminating the surrounding environment in fly-ash repositories, industrial mineral and metal mining sites, and landfill sites. These barriers are also useful for aqueous containment applications such as leachate ponds, retention ponds, and water storage reservoirs. The term "containment" when used herein refers to both aqueous containments (e.g., ponds) as well as other containments that have components that are better separated from the surrounding environment (e.g., fly-ash repositories). For example, "containment" may refer to the separation of ponds of liquid waste streams from industrial processes or leachates produced from these or other industrial processes from the surrounding environments. A "leachate" as that term is used herein refers to an effluent containing contaminants, produced from water (e.g., rain/storm water) percolating through a depository (e.g., a landfill, a fly-ash repository, etc.). A leachate usually contains a high concentration of electrolytes as compared to fresh water.

Clay materials, such as bentonite, have been used as low permeability barriers in containment applications. Bentonite is an aluminum phyllosilicate whose composition can vary in its dominant elements. When first mined or extracted, for example, sodium bentonite mined from Wyoming, often has a moisture content that is approximately about 30% to about 35% by weight. In many instances, this moisture may be removed to be about 6% to about 15% by weight. This is considered by the industry to be "dry" bentonite despite the significant moisture content. The moisture content may vary from application to application, and may be dependent on exposure to fluids in the ground that hydrates the bentonite to a higher moisture content.

Bentonite barrier compositions are often formulated from natural or sodium exchanged bentonite and mixed with common fluid additives. In many cases, the bentonite barrier compositions may be engineered from granular Wyoming natural sodium bentonite with the additives. The granularity or the relative particle size distribution, often described in terms of mesh size in the art, can determine how well the bentonite is packed and its ease of handling. A common use of bentonite geosynthetic clay liners is to line the base of landfills to prevent the migration of leachate and/or solutions containing high concentrations of electrolytes.

While bentonite is highly absorbent, able to absorb water several times its dry mass, aqueous fluids having complex chemistries can adversely affect its absorbency. These complex chemistries often involve electrolytes that may include, but are not limited to, cations and anions such as calcium, magnesium, potassium, iron, zirconium, lead, cobalt, copper, tin, silver, sulfates, chlorides, fluorides, bromides, and the like. The composition of the electrolytes may vary based on the source material of the containment (e.g., coal source for a fly-ash repository).

Bentonite can also be used in conjunction with a geosynthetic layer to form a geosynthetic clay liner. This technique may allow for convenient transport and installation of the bentonite, and greatly reduces the amount of bentonite required. The primary indicator of the effectiveness of a liner is "permeability." As used herein, the term "permeability" refers to the rate of flow of a fluid through a porous media (e.g., a clay liner) as measured in terms of cm/s. These barrier compositions should meet the permeability specification set by regulations (e.g., local, international, state and federal standards, etc.). It is desirable for a liner to be less permeable (i.e., have lower permeability) so that less materials are transported through the liner to the surrounding environment.

SUMMARY OF THE INVENTION

The present invention relates to improved bentonite barrier compositions, and more particularly, to the use of geosynthetic clay liners comprising these improved bentonite barrier compositions having enhanced low permeability over time in containment applications.

An embodiment comprises a method comprising: providing a bentonite barrier composition comprising: bentonite; and a polyanionic low molecular weight polymer; and forming a containment using the bentonite barrier composition to provide at least partial separation for a containment from its environment.

An embodiment comprises a method comprising: providing a geosynthetic clay liner comprising: at least a first geosynthetic layer; and a bentonite barrier composition comprising: bentonite and a polyanionic low molecular weight polymer; and forming a containment using the geosynthetic clay liner to provide at least partial separation for a containment from its environment.

An embodiment comprises a method comprising: providing a sandwich geosynthetic clay liner comprising: a first geosynthetic layer, at least a second geosynthetic layer, and a bentonite barrier composition that is sandwiched between the first geosynthetic layer and the second geosynthetic layer, the bentonite barrier composition comprising: bentonite and a polyanionic low molecular weight polymer; and forming a containment using the sandwich geosynthetic clay liner to provide at least partial separation for a containment from its environment.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

The present invention relates to improved bentonite barrier compositions, and more particularly, to the use of geosynthetic clay liners comprising these improved bentonite barrier compositions having enhanced low permeability over time in containment applications.

Of the many advantages of the present invention, the bentonite barrier compositions and geosynthetic clay liners of the present invention present long-lasting protection against contaminant seepage to the surrounding environment in containment applications involving complex chemistries. Containment applications often have complex electrolyte chemistries, which include electrolytes, such as anions and cations like calcium, potassium, magnesium, iron, zirconium, lead, cobalt, copper, tin, silver, sulfates, chlorides, bromides, fluorides, and any combination thereof. It is believed that the bentonite barrier compositions of the present invention are particularly useful in situations involving complex electrolyte chemistries because they contain a low molecular weight polyanionic polymer that is believed to bind (e.g., chelate) the electrolytes in the containment. This binding is believed to prevent the electrolytes from interacting with the bentonite in an undesirable manner. Moreover, when used in geosynthetic clay liners, the bentonite barrier compositions of the present invention provide enhanced retained permeabilities throughout the period of use of the liner, which is advantageous in terms of retarding the rate of seepage out of the containment to the surrounding environment over time. The term "retained permeability" refers to the permeability of a barrier or liner after at least 8 days of exposure to a solution comprising at least 450 ppm of electrolytes (e.g., calcium, magnesium, chloride, and sulfate). These advantages may be particularly important in view of rigorous regulations relating to containment applications.

The bentonite barrier compositions of the present invention generally comprise bentonite and a polyanionic low molecular weight polymer. Optionally, other additives may be included, depending on the desirability of including any such additives. These compositions may be used alone, for example in amended soil applications, or in geosynthetic clay liner applications. The term "geosynthetic clay liner" and its derivatives as used herein refer to manufactured hydraulic barriers comprising a bentonite composition and comprising at least one geosynthetic layer.

The bentonite component of the bentonite barrier compositions may comprise a natural bentonite or a modified bentonite. Both granular and powdered bentonite may be suitable; however, granular bentonite rather than powdered bentonite may be preferred for ease of manufacturing reasons. Modified bentonites may be suitable. These include those modified with potassium (K), sodium (Na), calcium (Ca), and aluminum (Al). Sodium bentonite may be especially suitable in the bentonite barrier compositions of the present invention. A suitable high quality bentonite is commercially available as "NATIONAL® Standard and/or Premium Bentonite" from Bentonite Performance Minerals LLC. Sodium bentonite's enhanced ability to swell makes it especially useful in the applications discussed herein.

In some embodiments, the bentonite that is used in the bentonite barrier compositions of the present invention may be pre-hydrated, if desired. For instance, the bentonite may have about a 50% moisture content for some applications. This may be an option when manufacturing a geosynthetic clay liner.

The concentration of bentonite in the bentonite barrier compositions of the present invention may vary. For example, the concentration of bentonite may be about 85% or greater by dry weight of the barrier composition. In some embodiments, the concentration of the bentonite may be about 90% or greater by dry weight of the barrier composition. In some embodiments, the concentration of the bentonite may be about 95% or greater by dry weight of the barrier composition. In some embodiments, the concentration of the bentonite may be about 98% or greater by dry weight of the barrier composition. In some embodiments, the concentration of the bentonite may be about 99.5% or greater by dry weight of the barrier composition.

As to the granular embodiments, the size of the particles may vary and can affect the packing of the bentonite and its ease of use. Suitable granular bentonites, referring to Table 1, may have a $d_{90}$ (which is the equivalent diameter where 90 mass-% (of the particles) of the powder has a smaller diameter (and hence the remaining 10% is coarser)) for the bentonite of about 6 mesh to about 60 mesh. The corresponding micron size is given in Table 1.

TABLE 1

| U.S. MESH | INCHES | MICRONS | MILLIMETERS |
| --- | --- | --- | --- |
| 3 | 0.2650 | 6730 | 6.730 |
| 4 | 0.1870 | 4760 | 4.760 |
| 5 | 0.1570 | 4000 | 4.000 |
| 6 | 0.1320 | 3360 | 3.360 |
| 7 | 0.1110 | 2830 | 2.830 |
| 8 | 0.0937 | 2380 | 2.380 |
| 10 | 0.0787 | 2000 | 2.000 |
| 12 | 0.0661 | 1680 | 1.680 |
| 14 | 0.0555 | 1410 | 1.410 |
| 16 | 0.0469 | 1190 | 1.190 |
| 18 | 0.0394 | 1000 | 1.000 |
| 20 | 0.0331 | 841 | 0.841 |
| 25 | 0.0280 | 707 | 0.707 |
| 30 | 0.0232 | 595 | 0.595 |
| 35 | 0.0197 | 500 | 0.500 |
| 40 | 0.0165 | 400 | 0.400 |
| 45 | 0.0138 | 354 | 0.354 |
| 50 | 0.0117 | 297 | 0.297 |
| 60 | 0.0098 | 250 | 0.250 |
| 70 | 0.0083 | 210 | 0.210 |
| 80 | 0.0070 | 177 | 0.177 |
| 100 | 0.0059 | 149 | 0.149 |
| 120 | 0.0049 | 125 | 0.125 |
| 140 | 0.0041 | 105 | 0.105 |
| 170 | 0.0035 | 88 | 0.088 |
| 200 | 0.0029 | 74 | 0.074 |
| 230 | 0.0024 | 63 | 0.063 |
| 270 | 0.0021 | 53 | 0.053 |
| 325 | 0.0017 | 44 | 0.044 |
| 400 | 0.0015 | 37 | 0.037 |

For the powdered bentonites, any suitable powdered bentonite useful for applications discussed herein is suitable for use in the present invention. Examples may have a $d_{50}$ of about 20 mesh to about 400 mesh. $d_{50}$ is the average equivalent diameter where 50 mass-% (of the particles) of the powder have a larger equivalent diameter, and the other 50 mass-% have a smaller equivalent diameter. In some embodiments, the $d_{50}$ is about 200 mesh.

An example of a suitable powdered bentonite for use in the present invention has the following particle size distribution: 100% has to pass through a 100 mesh, a minimum of 67% pass through a 200 mesh, and 2% pass through a 325 mesh.

The polyanionic low molecular weight polymer of the bentonite barrier compositions of the present invention may include guar gums, hydrolyzed low molecular weight acrylamides, polyacrylates, polyanionic cellulose, poly(sodium styrene sulfonate), polyacrylic acid, pectin, carrageenan, alginates, polyvinylpyrrolidone, and any combination of these. These are organic polymers which dissociate into anions in solution. An example of a suitable polyanionic low molecular weight polymer may be commercially available under a "PAC-R" tradename from Ashland Aqualon Functional Ingredients, a commercial unit of Ashland Inc., and other suppliers.

Preferably, the molecular weight should be about 1,000,000 or less. Thus, as used herein, the term "low molecular weight" refers to a weight average molecular weight of about 1,000,000 or less. In some embodiments, the molecular weight may range from about 50,000 to about 600,000. In some embodiments, the molecular weight may range from about 200,000 to about 300,000. It should be noted that if the polymers have too high of a molecular weight, this could lead to a flocculation of the clays in the bentonite, which is undesirable.

Polyanionic cellulose is a preferred polyanionic low molecular weight polymer for use in the bentonite barrier compositions of the present invention. Polyanionic cellulose is a nonionic cellulose ether that forms polyanionic species in aqueous solution. Polyanionic cellulose typically has a higher degree of carboxymethyl substitution and contains less residual NaCl than technical grade carboxymethylcellulose, although some polyanionic celluloses contain considerable NaCl. As a water-soluble polymer, it dissolves immediately in cold/hot water and can be used as a thickening agent, rheology controller, bond, stabilizer, suspending agent, and filtrate reducer. Low molecular weight polyanionic celluloses, as described for use in this invention, have good properties of salt resistance, which are useful in the context of the invention.

The concentration of the polyanionic low molecular weight polymer in the bentonite barrier compositions of the present invention may be about 0.1% to about 15% by dry weight of the barrier composition. In some embodiments, the concentration of the polyanionic low molecular weight polymer in the bentonite barrier compositions of the present invention may be about 0.4% to about 1%. In some embodiments, the concentration of the polyanionic low molecular weight polymer in the bentonite barrier compositions of the present invention may be about 0.5% to 0.7%. To determine the optimal amount to include, one should consider the composition (e.g., ionic content) and the concentration of any leachates present in the containment.

Although not wanting to be limited by any theory, it is believed that the polyanionic low molecular weight polymers effectively bind (or chelate) the electrolytes that are present in the containment, which prevents their interaction with the bentonite in the composition. Additionally, the polyanionic low molecular weight polymers provide some viscosity to the solution. The polyanionic low molecular weight polymers are also at a good molecular weight for interaction with the montmorillonite in the bentonite.

Optionally, the bentonite barrier compositions of the present invention, may further comprise at least one additive. Suitable additives include sodium carbonate, magnesium oxide, and magnesium hydroxide. If present, in some embodiments, these may be included in an amount of about 1% to about 8%, based on the dry weight of the composition. In some embodiments, they may be included in an amount of about 3% to about 4% based on the dry weight of the composition. An indication of the desirability of including these additives is the pH of the leachate in the containment as they may serve as pH adjusters. Additionally, water may be added to the bentonite barrier composition, if desired. Doing so may be desirable to aid manufacturing processes, for example, such as needle punching to form a liner.

The bentonite barrier compositions of the present invention may be used alone, in an amended soil application, or may be used to form a geosynthetic clay liner according to the present invention to form containments of contained matter (such as fluids and solids) to provide separation or to form a barrier between contained matter from the surrounding environment.

The contained matter may be aqueous and/or contain solids. In some embodiments, the contained matter may contain leachates. If desired, for example, to meet regulation standards, the bentonite barrier compositions of the present invention may be used to form aqueous containment ponds. The surrounding environment may contain groundwater. Oftentimes in containment applications, it is desirable to maintain as much separation as possible between the contained matter and the groundwater in the surrounding environment to minimize the potential contamination of the ground water by the contained matter (e.g., leachates) in the containment.

In some embodiments, the bentonite barrier compositions of the present invention may also be used alone (i.e., without combining it with soil or a geosynthetic layer) to form containments.

In amended soil applications, for example, one could mix the bentonite barrier compositions of the present invention with soil to impart a particular permeability to the soil, for example, in decorative ponds, fish ponds, and irrigation ponds. Such processes may be referred to as "amended soil" applications. The ratio of bentonite to soil may vary in any given amended soil application. In some embodiments, the ratio of bentonite to soil may be 50/50. In others, the ratio may be 60/40. In others, the ratio may be 30/70. In others, the ratio may be 25/75. In others, the ratio may be 1/99. The composition is then compacted using known compaction processes to form the desired containment.

In some embodiments, the bentonite barrier compositions of the present invention may also be used to form geosynthetic clay liners. In some embodiments, the geosynthetic clay liners of the present invention may be especially suitable for containment applications to separate contained matter that comprises complex electrolyte chemistries from the surrounding environment.

The geosynthetic clay liners of the present invention comprise at least one geosynthetic layer and a bentonite barrier composition of the present invention. The geosynthetic layers of the present invention include, but are not limited to, geotextiles, geofilms, and geomembranes. Preferred geosynthetic layers have extremely good puncture resistance. To form a geosynthetic clay liner, a bentonite composition of the present invention is placed upon a geosynthetic layer, preferably in a uniform distribution across the geosynthetic layer. Oftentimes, the bentonite composition is adhered to the geosynthetic layer, e.g., by an adhesive or by mechanical means. Suitable mechanical means include needle punching, compression techniques, and stitch bonding. In some embodiments, the geosynthetic layers may have a thickness of about 2 mm to about 25 mm. In some embodiments, the thickness may be less than about 2 mm.

Geotextiles that are suitable for use in the present invention are permeable fabrics that have the ability to separate, filter, reinforce, protect, and/or drain. The geotextiles hold the bentonite in the desired configuration. The geotextiles may be suitable to form sandwich geosynthetic clay liners (i.e., a geosynthetic clay liner where the bentonite composition is located between at least two geosynthetic layers) described herein or to form single layer geosynthetic clay liners as described herein.

Suitable geotextiles comprise polypropylene, polyester, or blends thereof, and can be woven or nonwoven. Needle-punched and heat-bonded types of geotextiles are examples of nonwoven geotextiles. Therefore, more specific examples of suitable geotextiles include, but are not limited to, polypropylene ("PP") nonwoven or woven geotextiles, polyethylene terephthalate ("PET") woven or nonwoven geotextiles, or woven or nonwoven geotextiles that comprise a blend of PP or PET. Suitable geotextiles are commercially available from GSE Lining Technology, LLC, in Houston, Tex., at www.gseworld.com.

In some embodiments of the present invention, the geotextiles may be coated with a coating or laminated with a geofilm. Suitable coatings may include, but are not limited to, PP coatings and polyurethane coatings. Also, in some embodiments of the present invention, a geofilm (described below) may be laminated to a geotextile through a suitable lamination process. Examples of suitable lamination techniques include heat processes and adhesive bonding. Using coatings or laminations may improve the durability of the geosynthetic clay liner.

Suitable geofilms for use in the present invention are durable films that are capable of being used in a containment application. An example of a geofilm is an impermeable film having a thickness of at least about 1 mm to about 10 mm. Suitable geofilms may comprise high density polyethylene ("HDPE"), low density polyethylene ("LDPE"), liner low density polyethylene ("LLDPE"), PP, polyvinylchloride ("PVC"), thermoplastic olefinic elastomers ("TPO"), ethylene propylene diene monomer ("EPDM"), and blends thereof. An example of a suitable geofilm may be commercially available under a "INTEPLUS®" tradename from Inteplast Group, Livingston, N.J.

Suitable geomembranes for use in the present invention are a kind of geosynthetic film that is a thicker film (e.g., 10 mm or thicker). Geomembranes are made of various materials including, but not limited to, HDPE, LDPE, LLDPE, PP, PVC, TPO, EPDM, and blends thereof. In some embodiments, these geomembranes may be reinforced with a geotextile.

In some embodiments, a bentonite barrier composition of the present invention may be adhesively bonded to a geomembrane to form a geosynthetic clay liner. In some embodiments, the bentonite barrier composition and the adhesive may be applied in alternating layers up to a desired thickness or weight of bentonite per square foot of the geosynthetic clay liner. When an adhesive is used, the adhesive may be used in an amount of about 2% to about 25% by weight of the bentonite. In some embodiments, the adhesive may be used in an amount of about 8% to about 12% by weight of the bentonite. In some embodiments, the adhesive may be used in an amount of about 10% by weight of the bentonite. Examples of adhesives suitable for use include, but are not limited to, those comprising an acrylic polymer (for example, commercially available from manufacturer Rohm and Haas Company under the tradename "ROBOND™ PS-90"), polyvinyl acetate (for example, commercially available from manufacturer Forbo Adhesives, LLC under the tradename "PACE®383"), or waterborne polyurethane dispersions (for example, commercially available from manufacturer Momentive Specialty Chemicals Inc. under the tradename "SNOWTACK 765A").

In the sandwich geosynthetic clay liner embodiments of the present invention, a bentonite barrier composition of the present invention may be sandwiched between at least two geosynthetic layers to form a sandwich geosynthetic clay liner that may be especially suitable for use in aqueous containment applications comprising complex chemistries. In some such sandwich geosynthetic clay liner embodiments, geotextiles may be preferred for use as at least one of the geosynthetic layers. In other sandwich geosynthetic clay liner embodiments, a mix of geosynthetic layers may be used, i.e., a geotextile as a first geosynthetic layer and a geomembrane as a second geosynthetic layer or vice-versa. Geofilms and geomembranes may also be incorporated in sandwich geosynthetic clay liners of the present invention. In certain embodiments, a geofilm or a geomembrane may be laminated on a geotextile to form a geosynthetic layer for the geosynthetic clay liner.

In the sandwich geosynthetic clay liner embodiments of the present invention, the sandwich layer between the geosynthetic layers comprises a bentonite barrier composition of the present invention. For example, the amount of bentonite barrier compositions in the sandwich layer of the liner may be about 0.25 lb/ft$^2$ to about 3 lb/ft$^2$ of the clay liner. In some embodiments, the amount of bentonite barrier compositions in the sandwich layer of the liner may be about 0.50 lb/ft$^2$ to about 1 lb/ft$^2$ of the clay liner. The thickness of the sandwich layer may also vary. In some embodiments, the thickness of the sandwich layer may be about 0.01 inch to about 2 inches in thickness.

In some embodiments an adhesive may be added to the bentonite barrier composition. Suitable examples of adhesive have been described above.

In some embodiments, moisture may be added to the bentonite composition so that when the sandwich layers are compressed (e.g., by suitable rollers), the bentonite in effect sticks to the geosynthetic layers to form a sandwich geosynthetic clay liner.

In other embodiments, a sandwich geosynthetic clay liner may be formed using a needle-punch or stitch-bonding technique.

Examples of making and installing geosynthetic clay liners are described in U.S. Pat. No. 6,303,204, the relevant disclosure of which is herein incorporated by reference.

Examining the retained permeability of a geosynthetic clay liner is a much better indication of performance of the liner as compared to examining the initial permeability of any such liner. Initial permeability is not a true indicator of compatibility or performance of a liner in containment applications involving leachate and/or solutions containing high concentrations of electrolytes.

The permeability of a geosynthetic liner of the present invention can be measured using Geotechnical Engineering Standard ASTM D5084-10, "Standard Test Methods for Measurement of Hydraulic Conductivity of Saturated Porous Materials Using a Flexible Wall Permeameter." This test may be best suited for an amended soil application test or the bentonite composition itself. ASTM D-5887, entitled "Standard Test Method of Measurement of Index Flux Through Saturated Geosynthetic Clay Liner Specimens Using a Flexible Wall Permeameter" may be specifically used to test geosynthetic clay liners in fresh water conditions. Additionally, ASTM D-6766, entitled "Standard Test Method for Evaluation of Hydraulic Properties of Geosynthetic Clay Liners Permeated with Potentially Incompatible Liquids," may be used. This test describes laboratory measurement of both flux and hydraulic conductivity of geosynthetic clay liner specimens utilizing a flexible wall permeameter. The test method measures one-dimensional, laminar flow of chemicals, landfill leachate, or contaminated water through a saturated/hydrated geosynthetic clay liner specimen under a set of conditions, such as an index test. The GRI-GCL3 specification, entitled "Test Methods, Required Properties, and Testing Frequencies of Geosynthetic Clay Liners (GCLs)" may be used with protocol D-6766 to demonstrate bentonite performance in calcium chloride or similar electrolyte solutions. This test may be useful to test site-specific leachates.

The geosynthetic clay liners of the present invention exhibit enhanced retained permeabilities that can be maintained over longer periods of time (e.g., in some embodiments, 30 days or more; in some embodiments, 170 days or more). Additionally, at least in some embodiments, it is believed that the geosynthetic clay liners of the present invention may retain these permeabilities for the useful life of the liner, depending on the application.

Additionally, in many embodiments, the geosynthetic clay liners of the present invention have a retained permeability that is better than $1 \times 10^{-8}$ cm/s. In some embodiments, the permeability of the geosynthetic clay liners of the present invention have a retained permeability that is better than $1 \times 10^{-9}$ cm/s, which represents one order of magnitude increase in retained permeability. In some embodiments, it is believed that the retained permeability of the geosynthetic clay liners of the present invention may be about $1 \times 10^{-10}$ cm/s.

Without being limited by any particular theory, it is currently believed that the bentonite barrier compositions of the present invention exhibit enhanced permeability properties in complex electrolyte environments (e.g., in fly ash, coal ash leachate environments, etc.) because of their high electrolyte resistance. In conventional bentonite compositions, it is believed that the presence of electrolytes significantly decreases the stability of the hydration of the bentonite, which can disrupt the clay mineral structure of the bentonite. It is believed that the electrochemical forces of polyanionic low molecular weight polymer play a role in chelating the electrolytes in solution, thus, preserving the ability of the bentonite to swell in the composition.

To facilitate a better understanding of the present invention, the following examples of preferred embodiments are given. In no way should the following examples be read to limit, or to define, the scope of the invention.

In order to demonstrate the effectiveness of geosynthetic clay liners of the present invention and the bentonite barrier compositions of the present invention, the following representative examples are given. They involve testing the geosynthetic clay liners of the present invention and the bentonite barrier compositions of the present invention in exemplary solutions comprising complex electrolyte chemistries.

Example 1

In order to demonstrate the effectiveness of geosynthetic clay liner of the present invention, permeability parameters of geosynthetic clay liners were measured in solutions comprising complex electrolyte chemistries over time. Acid mine leachate, a synthetic leachate (Solution 1 as described in Table 2), and fly-ash leachate, an in situ leachate taken from real world depository (Solution 2 as described in Table 2) samples were analyzed by a third party independent lab. The composition of these leachates are given in Table 2 below. The testing of the liners was performed with these leachates. Additionally, different initial moisture contents of the bentonite in the bentonite barrier composition in the liner were tested to determine the effect of the initial moisture content on the retained permeability observed with the varying solution chemistries at a confining stress of 5.0 psi.

TABLE 2

Liquid Analysis with High Ionic Strength

| Electrolytes | Acid Mine Drainage (Synthetic) Solution 1 (mg/L) | Fly-Ash Leachate (Real World) Solution 2 (mg/L) |
|---|---|---|
| Cations | | |
| Calcium | 660 | 820 |
| Magnesium | 4,000 | 340 |
| Potassium | 660 | 30 |
| Sodium | 670 | 82 |
| Anions | | |
| Chloride | 8,600 | 1,300 |
| Sulfate | 10,000 | 1,900 |

As a control sample and for comparison, permeability parameters were measured for an unamended bentonite liner (meaning a liner comprising a bentonite composition that does not have a polyanionic low molecular weight polymer included within the composition) to determine its retained permeability in Solution 1. The unamended bentonite control sample was a PP geotextile sandwich liner having a natural sodium bentonite composition in the middle layer that has an "as received" moisture content of approximately 10%. The "std. bentonite" line on FIG. 1 shows the results.

Figure 1:
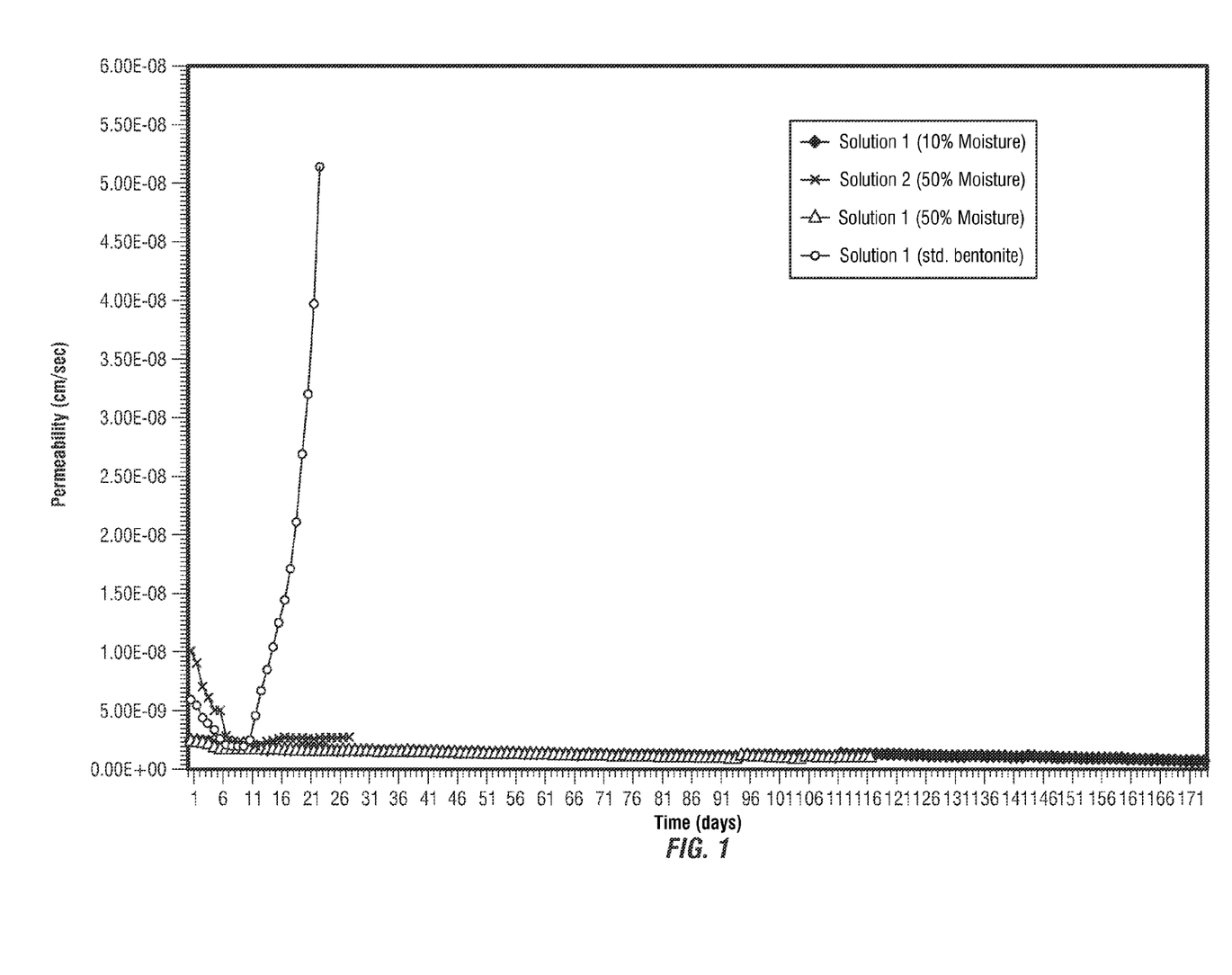
FIG. 1 shows data described in Example 1.

FIG. 1 shows that the std. bentonite control sample in Solution 1 exhibits a rapid increase in permeability within days after contacting the leachate. The permeability parameters were measured for at least 25 days to determine retained permeability characteristics. The testing on this sample was terminated at 25 days since a trend of increasing permeability was established. In this particular test, the undesirable increase in retained permeability of the unamended bentonite liner in Solution 1 appears particularly troublesome following day 11.

For comparison, several tests were performed using samples of a geosynthetic clay liner that comprise a bentonite barrier composition of the present invention. The geosynthetic clay liner sample was from a sandwich geosynthetic clay liner that included two PP geotextile layers with a bentonite barrier composition of the present invention comprising approximately 99% bentonite and approximately 1% polyanionic cellulose at approximately 0.75 lb/ft$^2$. The samples of a geosynthetic clay liner were tested per ASTM D6766 protocol to show permeability parameters in Solutions 1 and 2 (see Table 2 for the compositions of Solutions 1 and 2). The permeability parameters were measured over time for at least 25 days or more as indicated in FIG. 1, after the geosynthetic clay liners first contacted the electrolyte solution. See FIG. 1 for specifics as to each solution and liner sample.

In the first test, a sandwich geosynthetic clay liner of the present invention having a bentonite barrier composition as described herein and having approximately 10% moisture content was tested in Solution 1. The initial moisture content was 10% due to the inherent as received moisture content of the bentonite in the liner. Over time, this geosynthetic clay liner sample showed enhanced retained permeability while contacting Solution 1 over time, relative to the control sample, labeled "std. bentonite" in FIG. 1. As shown in FIG. 1, this geosynthetic clay liner sample exhibited retained permeabilities for more than 171 days of better than $5 \times 10^{-9}$ cm/s.

Similarly, in the second and third tests, additional samples of a sandwich geosynthetic clay liner of the present invention having a bentonite barrier composition as described herein was tested. The initial moisture content of the samples was 50% due to the addition of moisture to the bentonite to simulate potential field conditions. These geosynthetic clay liner samples were exposed to Solutions 1 and 2 in separate tests. Referring to FIG. 1 and referring to the test with Solution 1, this liner sample demonstrated retained permeability of less than about $5 \times 10^{-9}$ cm/s. (See the triangle line in FIG. 1) Referring to FIG. 1 and referring to the test with Solution 2, this geosynthetic clay liner sample also demonstrated retained permeability of less than about $5 \times 10^{-9}$ cm/s. In both geosynthetic clay liner samples, the retained permeability appears to be enhanced relative to the control sample.

Thus, Example 1 illustrates that the geosynthetic clay liners containing bentonite barrier compositions of the present invention may exhibit, among other things, excellent retained permeability in the presence of complex electrolyte chemistries. The challenged component in these experiments is the bentonite barrier composition; and therefore, this experiment illustrates the efficacy of the bentonite barrier compositions of the present invention in any containment application utilizing bentonite barrier compositions of the present invention.

Example 2

The goal of this test was to explore the permeability of an unamended bentonite composition, i.e., one that does not contain a polyanionic low molecular weight polymer according to the present invention, without a liner. The ASTM D6766 standard protocol per GRI-GCL3 was used at a confining stress of 5.0 psi. The synthetic brine in the experiment contained 0.1N (or approximately 12,000 mg/L) $CaCl_2$.

Figure 2:
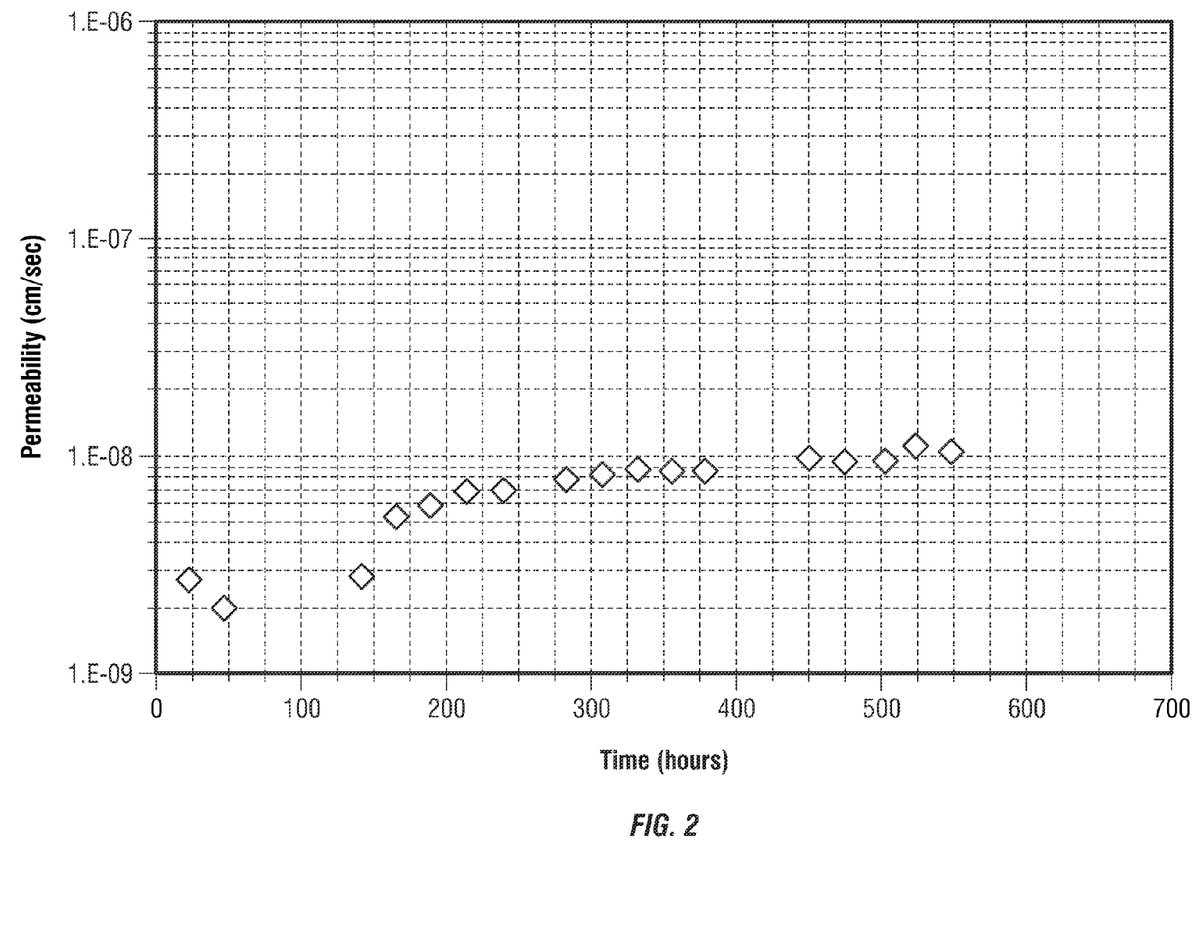
FIG. 2 shows data described in Example 2.

FIG. 2 shows that a sharp increase in permeability was observed after approximately 220 hours (~9 days) in the synthetic brine. Thus, the data in FIG. 2 confirms the lack of retained permeability of a standard unamended bentonite in electrolyte conditions as shown in FIG. 1 within a reasonable margin of error.

Example 3

In this example, ASTM D5084 protocol was used to evaluate the retained permeability of certain bentonite barrier compositions comprising approximately 99% bentonite and approximately 1% polyanionic cellulose (not incorporated within a geosynthetic clay liner) of the present invention in fly-ash leachate (Solution 2 in Table 2). This is referred to as amended bentonite in Table 3. This experiment involved measuring the permeability of the bentonite barrier composition sample in a leachate solution at a confining stress of 5.0 psi. The permeability was measured after 11 days of being in contact with the leachate solution. The result of the experiment is summarized in Table 3 below.

Table 3 shows that the bentonite barrier composition displayed a retained permeability of approximately $6 \times 10^{-10}$ cm/s, which indicates that the bentonite barrier composition of the present invention is able to maintain an enhanced retained permeability. Thus, this Example suggests that the bentonite barrier composition of the present invention is effective to provide enhanced retained permeability in complex electrolyte chemistries.

TABLE 3

| Sample | Effective Confining Stress (psi) | Permeability (cm/s) |
| --- | --- | --- |
| Amended bentonite | 5.0 | $6.0 \times 10^{-10}$ |

Example 4

In this Example, leachate from a synthetic gypsum (calcium sulfate dehydrate) and leachate combining fly ash, bottom ash, and gypsum were used to test geosynthetic clay liners according to one or more embodiments. The leachate contents are summarized in Table 4 below.

In each of the testing, two separate geosynthetic clay liners were prepared. A standard sodium bentonite geosynthetic clay liner, the control sample, was manufactured with 0.75 lbs/ft$^2$ of standard sodium bentonite (available as BARA-KADE® 30 from Halliburton Energy Services, Inc.). A polymer amended (polyanionic cellulose) bentonite geosynthetic clay liner was manufactured with 0.75 lbs/ft$^2$ of polymer amended bentonite (available as BARA-KADE® 30 LP from Halliburton Energy Services, Inc.). Both the standard bentonite and the polymer amended bentonite were sandwiched between layers of polypropylene geotextiles in accordance with one or more embodiments of the present invention.

Figure 3:
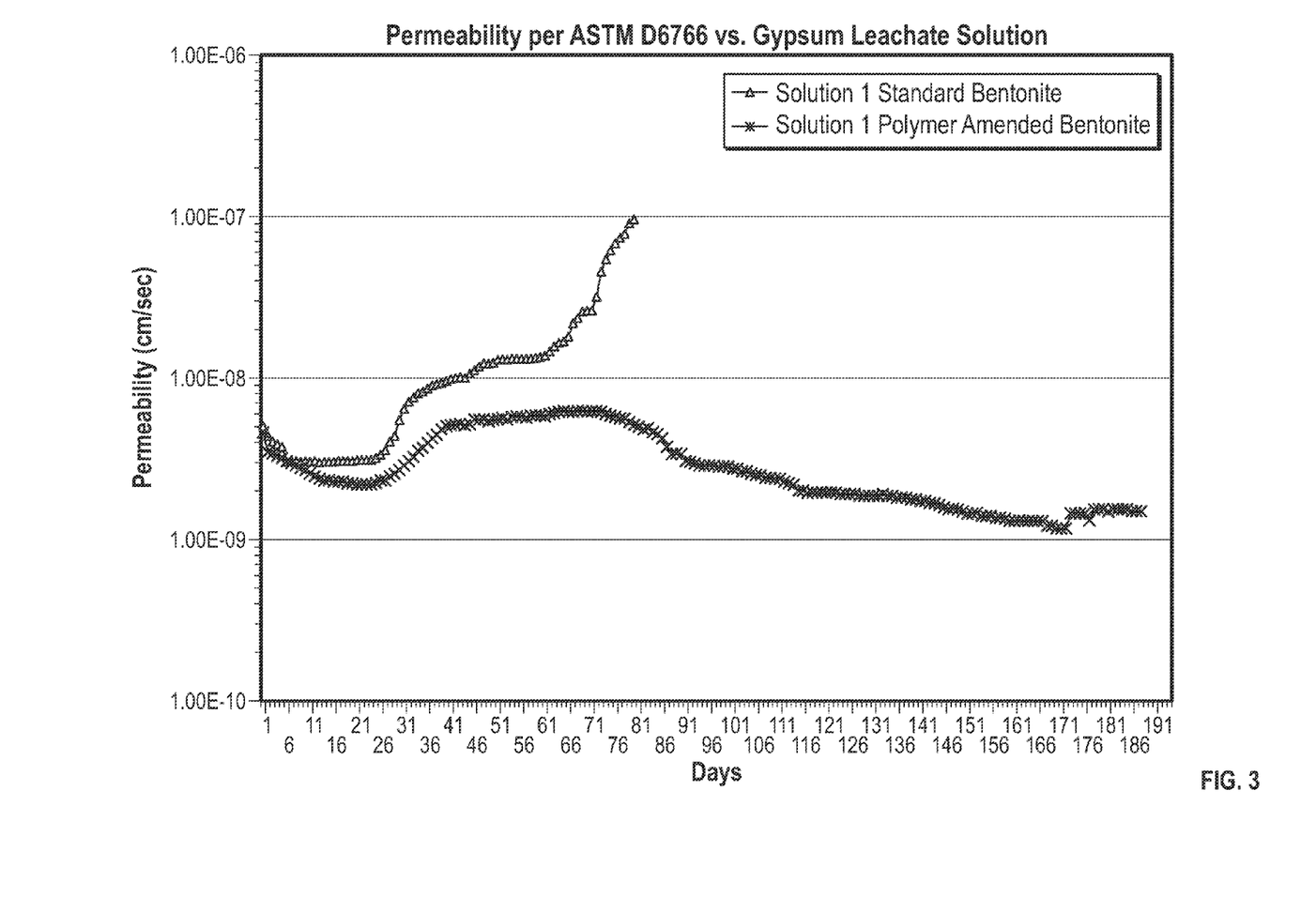
FIG. 3 shows data described in Example 4.

The first set of permeability tests were performed on the two geosynthetic clay liners using a synthetic gypsum leachate (Solution 1 of Table 4). These permeability tests were conducted in accordance with ASTM D6766 protocol using 4 inch diameter flexible permeameter with an effective stress of 5 psi. As shown in FIG. 3, the standard sodium bentonite geosynthetic clay liner testing was terminated after the permeability of the standard bentonite geosynthetic clay liner was reduced to approximately $1 \times 10^{-7}$ cm/sec (after approximately 82 days). Approximately 70 pore volumes of leachate were allowed to flow through the standard bentonite geosynthetic clay liner.

Also shown in FIG. 3, the permeability test on the polymer amended bentonite geosynthetic clay liner was performed for at least 188 days at the end of which the permeability of the polymer amended bentonite geosynthetic clay liner leveled off at approximately $1.64 \times 10^{-9}$ cm/sec (FIG. 3). Approximately 27 pore volumes of leachate were allowed to flow through the polymer amended bentonite geosynthetic clay liner.

TABLE 4

| Electrolytes | Synthetic Gypsum Solution 1 (mg/L) | Fly Ash/Bottom Ash/Gypsum Solution 2 (mg/L) |
| --- | --- | --- |
| Cations | | |
| Calcium | 580 | 480 |
| Magnesium | 220 | 530 |
| Potassium | 14 | 93 |
| Sodium | 78 | 2200 |
| Anions | | |
| Chloride | 250 | 980 |
| Sulfate | 2200 | 7600 |

The second set of permeability tests were performed on the two geosynthetic clay liners using a leachate combining fly ash, bottom ash, and gypsum (Solution 2 in Table 4).

Figure 4:
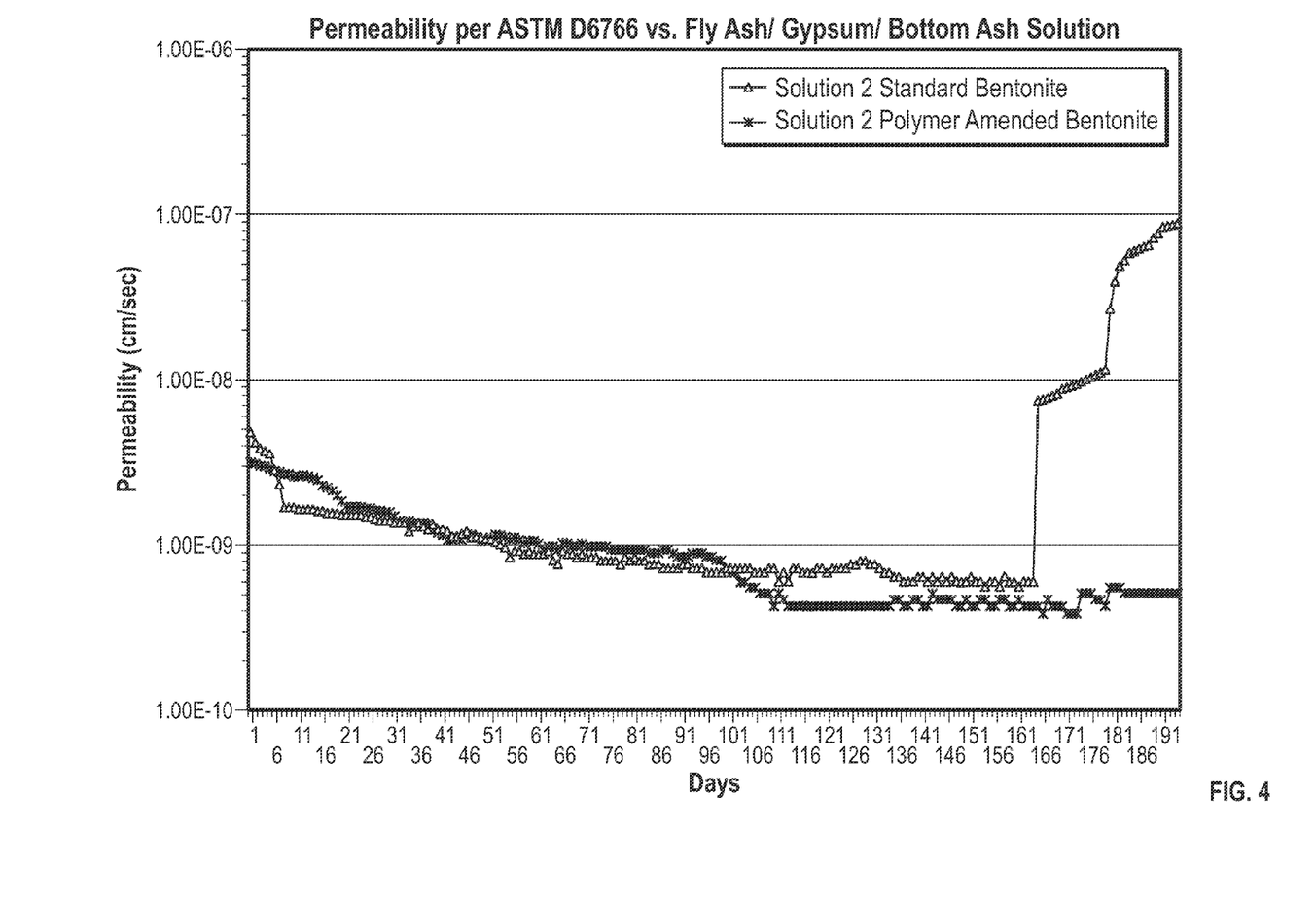
FIG. 4 shows data described in Example 4.

These permeability tests were also conducted in accordance with the ASTM D6766 protocol using 4 inch diameter flexible permeameter with an effective stress of 5 psi. As shown in FIG. 4, the permeability test with a standard bentonite geosynthetic clay liner was performed for 194 days or until the permeability value was reduced to approximately $1\times10^{-7}$ cm/sec. Approximately 35 pore volumes of leachate were allowed to flow through the standard bentonite geosynthetic clay liner. The permeability test with the polymer enhanced bentonite geosynthetic clay liner was performed for 194 days at the end of which the permeability of the polymer enhanced bentonite geosynthetic clay liner leveled off at approximately $5.12\times10^{-10}$ cm/sec (FIG. 4). Approximately 10 pore volumes of leachate were allowed to flow through the polymer amended bentonite geosynthetic clay liner.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method consisting of:
   providing a geosynthetic clay liner consisting of:
      at least a first geosynthetic layer; and
      a bentonite barrier composition consisting of: bentonite and a polyanionic low molecular weight polymer selected from the group consisting of: poly(sodium styrene sulfonate), pectin, carrageenan, and any combination of these;
   providing waste matter to be contained; and,
   forming a containment using the geosynthetic clay liner wherein the geosynthetic clay liner provides separation between the waste matter to be contained and a surrounding environment, wherein the polyanionic low molecular weight polymer binds electrolytes present in the contained matter to prevent the contained matter from interacting with the bentonite and wherein the electrolytes in the waste matter consist of iron, zirconium, lead, cobalt, copper, tin, silver, chloride, bromide, fluoride, and any combination thereof.

2. The method of claim 1 wherein the first geosynthetic layer is a geotextile or a geomembrane.

3. The method of claim 1 wherein the first geosynthetic layer comprises a structure selected from the group consisting of: a nonwoven structure, a woven structure, and any combination thereof.

4. The method of claim 1 wherein the geosynthetic layer is laminated with a geofilm or coated with a coating.

5. The method of claim 1 wherein the bentonite barrier composition is adhered to the geosynthetic layer by an adhesive and/or by a mechanical means.

6. The method of claim 1 further comprising a second geosynthetic layer that is a geotextile, a geofilm, or a geomembrane.

7. The method of claim 1 wherein the bentonite barrier composition is present in an amount of about 0.25 to about 3 lb/ft$^2$ of the geosynthetic clay liner.

8. The method of claim 1 wherein the geosynthetic clay liner has a retained permeability of about $1\times10^{-8}$ cm/s or lower.

9. The method of claim 1 wherein the geosynthetic clay liner has a retained permeability of about $1\times10^{-9}$ cm/s or lower.

10. A method consisting of:
    providing a sandwich geosynthetic clay liner consisting of:
       a first geosynthetic layer,
       at least a second geosynthetic layer, and
       a bentonite barrier composition that is sandwiched between the first geosynthetic layer and the second geosynthetic layer, the bentonite barrier composition consisting of: bentonite and a polyanionic low molecular weight polymer selected from the group consisting of: poly(sodium styrene sulfonate), pectin, carrageenan, and any combination of these;
    providing waste matter to be contained; and,
    forming a containment using the sandwich geosynthetic clay liner wherein the geosynthetic clay liner provides separation between the waste matter to be contained and the surrounding environment, wherein the polyanionic low molecular weight polymer binds electrolytes present in the contained matter to prevent the contained matter from interacting with the bentonite and wherein the electrolytes in the contained waste consists of calcium, potassium, magnesium, iron, zirconium, lead, cobalt, copper, tin, silver, chloride, bromide, fluoride, and any combination thereof.

11. The method of claim 10 wherein the containment is located at a landfill site, an industrial mineral site, a mining site, a fly-ash repository site, or a coal-ash repository site.

* * * * *